Patented Jan. 15, 1929.

1,699,163

UNITED STATES PATENT OFFICE.

RUDOLF SCHISKE, OF VIENNA, AUSTRIA.

DEVICE FOR MEASURING THE QUANTITY OF A LIQUID OR GASEOUS MEDIUM PASSING THROUGH THE DEVICE IN ONE UNIT OF TIME.

Application filed July 7, 1925, Serial No. 42,078, and in Austria July 11, 1924.

This invention relates to a device for measuring the quantity of a liquid or gaseous medium passing through the device in one unit of time of the kind in which the difference in pressure between two compartments, which are in communication with one another by nozzles or passages, is measured by the deformation of diaphragms.

According to the present invention one or more nozzles or passages of an invariable cross-sectional area is or are arranged in the partition between the compartments. This arrangement has the advantage of considerably simplifying the construction of the measuring device.

According to a convenient construction of the device, the measuring nozzle is disposed directly in the diaphragm, whereby the frictional resistance to which the medium, flowing or passing through the nozzle, is subjected and which acts in the same sense as the difference in pressure, is utilized for measuring.

Several modes of carrying out the present invention are diagrammatically illustrated by way of example on the accompanying sheet of drawings in which:—

Figure 1:
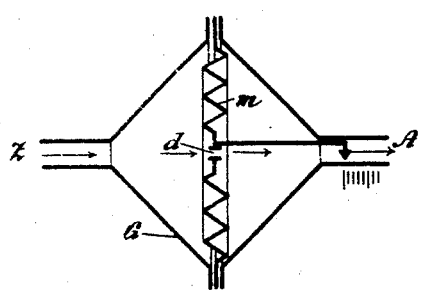
Figs. 1, 2 and 3 show constructions provided with disc-shaped diaphragms.

In the construction illustrated in Fig. 1, a casing G is divided into two compartments by means of an elastic diaphragm $m$, furnished with a nozzle or passage $d$. The medium enters at Z and leaves the device at A. The diaphragm $m$ adjusts itself according to the difference in pressure between the inlet Z and the outlet A, and is connected with a convenient indicator, which can be inspected when making the casing of transparent material.

Besides the difference in pressure which, in the construction according to Fig. 1, bellies or bulges out the diaphragm toward the right hand side, also the friction of the medium acts in the nozzle $d$ in the same direction and has the tendency to move the nozzle in the direction of flow, e. g. toward the right side.

Figure 2:
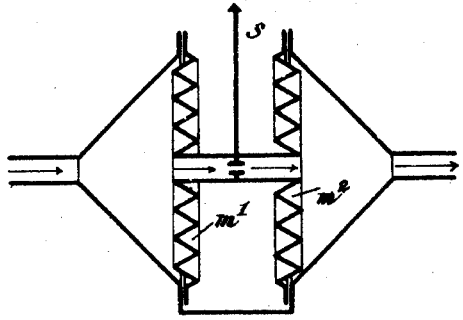

Two diaphragms $m^1$ and $m^2$, connected with one another by a nozzle-channel, are employed in the arrangement shown in Fig. 2. Owing to the action of the difference in pressure, both diaphragms are moved in the same direction and take with them the nozzle-channel, and the movement of the latter is transmitted to a pointer S, playing on a scale.

The advantage of this construction resides in that the pointer is arranged between the diaphragms, but outside the casing, so that the latter does not require to be transparent.

Figure 3:
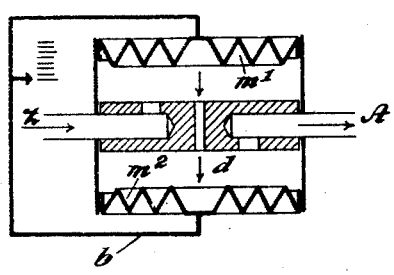

In the construction shown in Fig. 3 the nozzle, as well as the inlet and outlet channels Z and A are arranged in a solid wall, disposed between the diaphragms $m^1$ and $m^2$, and both diaphragms are connected with one another by a rigid bracket $b$.

Figure 4:
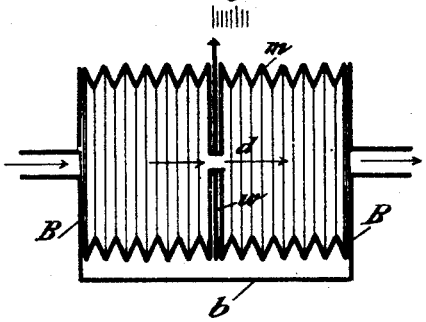
Figs. 4 and 5 are arrangements with cylindrical diaphragms in the shape of bellows.
Figure 5:
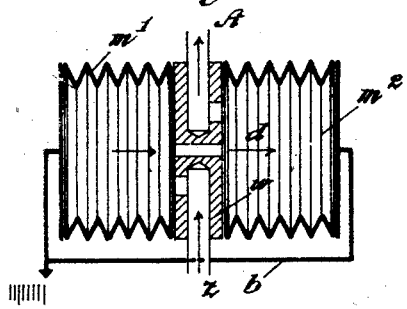

The construction of the arrangements illustrated in Figs. 4 and 5 correspond essentially to the embodiments above described, with the exception that one or two cylindrical diaphragms are used instead of the flat diaphragms.

In the embodiment shown in Fig. 4, the interior space of a cylindrical diaphragm $m$ is divided into two compartments by a partition $w$, provided with a passage or nozzle $d$. A rigid bracket $b$ connects the two sides B of the cylindrical diaphragm with each other. Owing to the difference in pressure caused by the inflowing and outflowing medium, the partition $w$ adjusts itself in different positions in the axial direction of the diaphragm and thereby transmits its movement to a pointer, playing on a scale.

In the construction shown in Fig. 5, two cylindrical diaphragms $m^1$ and $m^2$ are provided, which are separated from one another by a rigid partition $w$, an inlet channel Z and an outlet channel A, as well as a nozzle or passage $d$ being arranged in the said partition $w$.

In all embodiments a number of nozzles of suitable cross-sectional area may be arranged in the partition.

I claim:—

1. A device for measuring the quantity of a liquid or gaseous medium passing through the device in one unit of time, comprising in combination two casings, a diaphragm, each casing being closed by said diaphragm, means for establishing communication between the said casings, means in the latter for introducing and discharging the medium, a pointer attached to and operated by the diaphragms, and a scale with which the pointer cooperates.

2. A device for measuring the quantity of a liquid or gaseous medium passing through the device in one unit of time, comprising in combination a casing, a partition dividing the latter into two compartments, a diaphragm, each compartment being closed by said diaphragm, an inlet and an outlet in the casing for the introduction and discharge of the medium, there being passage in the partition dividing the casing into two compartments for establishing communication between the two compartments, a pointer attached to and operated by the diaphragms, and a scale with which the pointer cooperates.

3. A device for measuring the quantity of a liquid or gaseous medium passing through the device in one unit of time, comprising in combination a casing provided with an inlet for the introduction of the medium and with a diaphragm forming one side of the same, a second casing furnished with an outlet for the discharge of the medium and with a diaphragm forming one side of the same, a nozzle of invariable cross-sectional area establishing communication between the two diaphragms, a pointer attached to the said passage, and a scale with which the pointer cooperates.

In testimony whereof I affix my signature.

RUDOLF SCHISKE.